United States Patent
Park et al.

(10) Patent No.: US 7,116,290 B2
(45) Date of Patent: Oct. 3, 2006

(54) METHOD AND APPARATUS FOR DIAGNOSING CELL DEFECT OF PDP MODULE

(75) Inventors: Su Won Park, Daegu (KR); So Hee Heo, Daegu (KR)

(73) Assignee: LG Electronics Inc., Seoul (KR)

(*) Notice: Subject to any disclaimer, the term of this patent is extended or adjusted under 35 U.S.C. 154(b) by 221 days.

(21) Appl. No.: 10/379,790

(22) Filed: Mar. 6, 2003

(65) Prior Publication Data

US 2004/0041850 A1    Mar. 4, 2004

(30) Foreign Application Priority Data

Aug. 13, 2002  (KR) .................. 10-2002-0047784

(51) Int. Cl.
G09G 3/28    (2006.01)

(52) U.S. Cl. ..................... 345/60; 345/55; 345/76; 345/87; 382/141

(58) Field of Classification Search .......... 345/60, 345/55, 76, 87; 382/141
See application file for complete search history.

(56) References Cited

U.S. PATENT DOCUMENTS

| | | | | |
|---|---|---|---|---|
| 4,594,588 | A | * | 6/1986 | Barclay et al. ............. 345/68 |
| 5,745,201 | A | * | 4/1998 | Kawai et al. ............. 349/110 |
| 6,831,995 | B1 | * | 12/2004 | Asano et al. ............. 382/141 |
| 6,897,440 | B1 | * | 5/2005 | Yamada .................... 250/306 |
| 2002/0158875 | A1 | * | 10/2002 | Yamada .................... 345/440 |

* cited by examiner

Primary Examiner—Bipin Shalwala
Assistant Examiner—Leonid Shapiro
(74) Attorney, Agent, or Firm—Fleshner & Kim, LLP (57) ABSTRACT

A method and apparatus can diagnose a cell defect of a PDP module. The method can include dividing a screen of a PDP module into a plurality of regions, displaying a pattern for diagnosing the cell defect on less than all the regions, and blocking at least one of the remaining regions. Further, determined cell defects identified in at least two of the plurality of regions have different weights when combined to determine a resulting value for comparison to a threshold for the PDP module.

22 Claims, 9 Drawing Sheets

FIG. 1

(Related Art)

FIG. 2

(Related Art)

METHOD AND APPARATUS FOR DIAGNOSING CELL DEFECT OF PDP MODULE

BACKGROUND OF THE INVENTION

1. Field of the Invention

The present invention relates to a plasma display panel (PDP) module, and more particularly, to a method and apparatus for diagnosing a cell defect of a PDP module.

2. Background of the Related Art

PDP modules are employed in a large-scale television receiver, a monitor or the like since the modules are easily scaled up and colorized. A defective status of the module is determined based on a cell defect. A related art method for diagnosing the cell defect to determine whether or not the PDP module is defective will now be described with reference to FIGS. 1 and 2.

Figure 1:
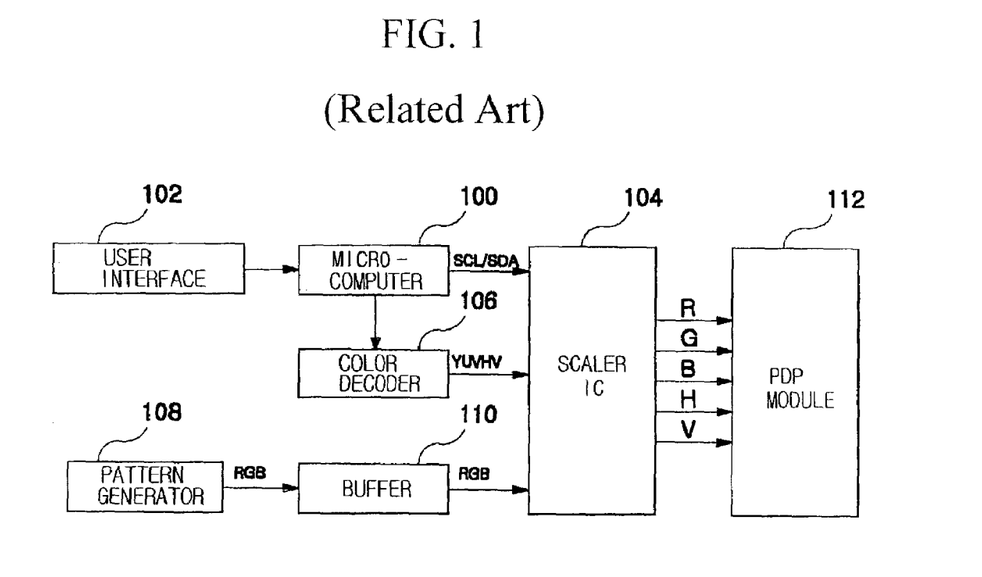
FIG. 1 is a block diagram that shows a related art PDP television receiver.

In general, a microcomputer 100 controls the television receiver, and a user interface 102 interfaces between a user and the microcomputer 100. A color decoder 106 receives a chrominance signal from a broadcasting signal receiver (not shown) to extract luminance signals and a vertical/horizontal sync signal (YUVHV) and then supplies them to a scaler IC 104. A pattern generator 108 includes various patterns containing a pattern to diagnose the cell defect, and supplies the pattern to the scaler IC 104 via a buffer 110. The scaler IC 104 scales the video signals YUVHV and RGB inputted according to the control of the microcomputer 100 to output the result to a PDP module 112. The PDP module 112 displays the output RGBHV of the scaler IC 104 on the screen.

Figure 2:
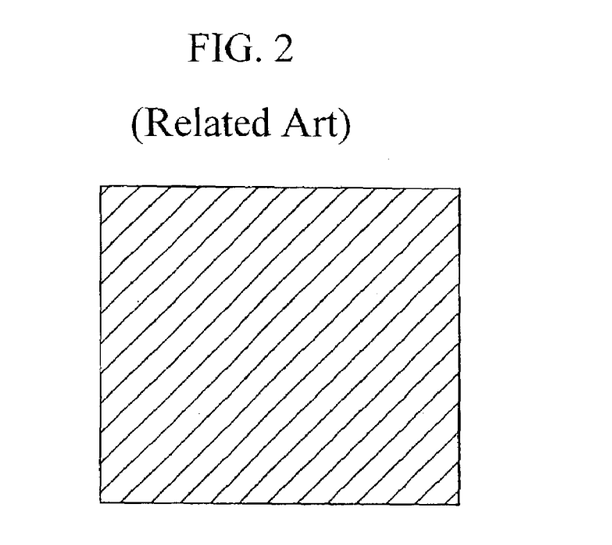
FIG. 2 is a diagram showing an example of a displayed pattern to diagnose a cell defect according to a related art method.

The related art method for diagnosing the cell defect employed in the PDP television receiver will now be described. If the diagnostician operates a command for entry into a diagnosing mode of the cell defect via the user interface 102, the microcomputer 100 controls the respective parts to display the pattern for diagnosing the cell defect on the PDP module 112, as shown in FIG. 2.

The diagnostician diagnoses the cell defect by examining the pattern displayed on the screen of the PDP module 112 with the unaided eye. The cell defect is diagnosed for the entire screen by use of the pattern displayed on the entire surface of the screen.

As described above, the related art apparatus and method for diagnosing a cell defect in a PDP device using a PDP module has various disadvantages. In the related art, the cell defect of the border region and the cell defect of the center region are considered equivalent parameters when used to determine whether or not the PDP module is defective.

The equal process or treatment of the cell defects of the border and center regions in the related art causes a PDP module, which can have few cell defects or little to no problems in actual use, to be regarded as defective. Further, it can be very difficult to detect the cell defect for the entire surface particularly with the scale-up of the PDP module of the entire surface of the wide screen with the unaided eye. Accordingly, there is a long felt need for an apparatus and method capable of diagnosing a cell defect by a diagnostician or the like of the PDP module.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a method and apparatus that is capable of diagnosing a cell defect of a display device that substantially obviate one or more problems caused by limitations and disadvantages of the related art.

Another object of the present invention to provide a method and apparatus for diagnosing a cell defect of a display device by dividing a screen into an observing region and a non-observing region.

Another object of the present invention to provide a method and apparatus for diagnosing a cell defect of a display device by dividing a screen into a plurality of regions and varies an observing region and a non-observing region among the plurality of regions.

Another object of the present invention to provide a method and apparatus for diagnosing a cell defect of a display device by dividing a screen into a plurality of regions and at least two regions among the plurality of regions having different weights for identified cell defects.

Another object of the present invention is to provide a method and apparatus capable of diagnosing a cell defect of a PDP module by setting a portion of a screen as a diagnosing region and magnifying, demagnifying or shifting the diagnosing region according to the request of a user.

To achieve at least the above objects and other advantages in a whole or in part and in accordance with the purpose of the invention, as embodied and broadly described herein, there is provided a method for diagnosing a cell defect of a PDP module, that includes dividing an entire screen of the PDP module into a plurality of regions; displaying a pattern for diagnosing the cell defect on a portion of the regions; and blocking the remaining portion of the regions.

To further achieve at least the above objects and other advantages in a whole or in part and in accordance with the purpose of the invention, as embodied and broadly described herein, there is provided a method for diagnosing a cell defect of a PDP module, that includes dividing a screen of the PDP module into a plurality of regions, and displaying a pattern for diagnosing the cell defect on a portion of the regions, wherein the remaining portion of the regions do not display the pattern.

To further achieve at least the above objects and other advantages in a whole or in part and in accordance with the purpose of the invention, as embodied and broadly described herein, there is provided an apparatus configured to diagnose a cell defect of a PDP module that includes a scaler IC configured to receive and output a pattern for diagnosing the cell defect, the PDP module configured to display an output of the scaler IC, and a microcomputer configured to control the scaler IC to block a remaining region of a screen of the PDP module except for a diagnosing region configured to display the pattern.

To further achieve at least the above objects and other advantages in a whole or in part and in accordance with the purpose of the invention, as embodied and broadly described herein, there is provided a method that includes determining a plurality of regions in a display device, and displaying a pattern for evaluating a characteristic of the display device in at least a first region of the plurality of regions, wherein the characteristic identified in a second region of the plurality of regions has a different weight than in a first region.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIGS. 9a to 9f are diagrams showing examples of a diagnosed region display to diagnose a cell defect according to another preferred embodiment of the present invention.

DETAILED DESCRIPTION OF PREFERRED EMBODIMENTS

Preferred embodiments according to the present invention can divide a screen of a PDP module to let a diagnostician diagnose a cell defect. Further, preferred embodiments according to the present invention can demagnify or magnify the divided screen in response to a request such as the request of the diagnostician. In addition, preferred embodiments according to the present invention can apply different weighted values according to divided regions of a screen to reduce a defective rate of a PDP module.

A first preferred embodiment according to the present invention can reduce or minimize a defective fraction of PDP modules by dividing the screen of a PDP module into a plurality of regions and applying the different weighted values for cell defects according to the divided region. The first preferred embodiment of an apparatus and method will now be described with reference to FIGS. 3 to 6.

Figure 3:
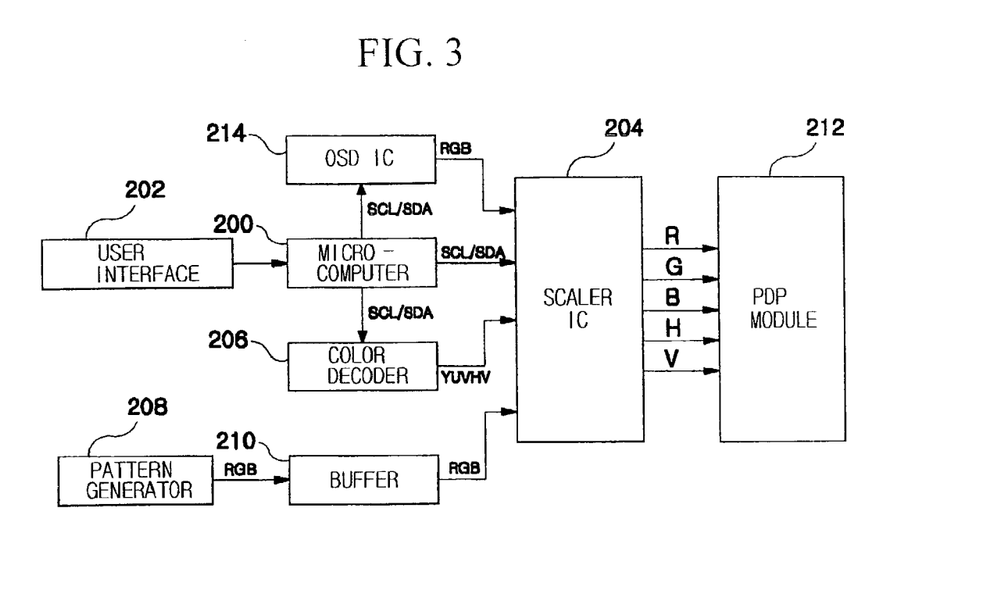
FIG. 3 is a block diagram that shows a PDP television receiver according to a preferred embodiment of the present invention.

As shown in FIG. 3, a schematic view of an exemplary PDP device such as a television receiver according to the first preferred embodiment can include a microcomputer 200 that controls the PDP television receiver, and a user interface 202 that interfaces between a user and the microcomputer 200. A color decoder 206 can receive a chrominance signal from a broadcasting signal receiver (not shown) to extract luminance signals and a vertical/horizontal sync signal (YUVHV) and then supply the signals to a scaler IC 204. A pattern generator 208 can include various patterns containing a pattern to diagnose the cell defect, and supplies a pattern (e.g., RGB) to the scaler IC 204 preferably via a buffer 210. An on-screen display OSD IC 214 can supply a video signal RGB to the scaler IC 204 to display an on-screen-display (OSD) according to the control of the microcomputer 200. The scaler IC 204 preferably scales the video signals YUVHV and RGB inputted according to the control of the microcomputer 200 to output the result to a PDP module 212. The PDP module 212 can display the output RGBHV of the scaler IC 204 on the screen. The OSD IC 214 and the microcomputer 200 can be included on a single chip.

An exemplary method according to the first preferred embodiment of the present invention will now be described using the flow chart shown in FIG. 4. The method can be incorporated into the PDP device of FIG. 3 and will be described using same. However, the present invention is not intended to be so limited.

Figure 4:
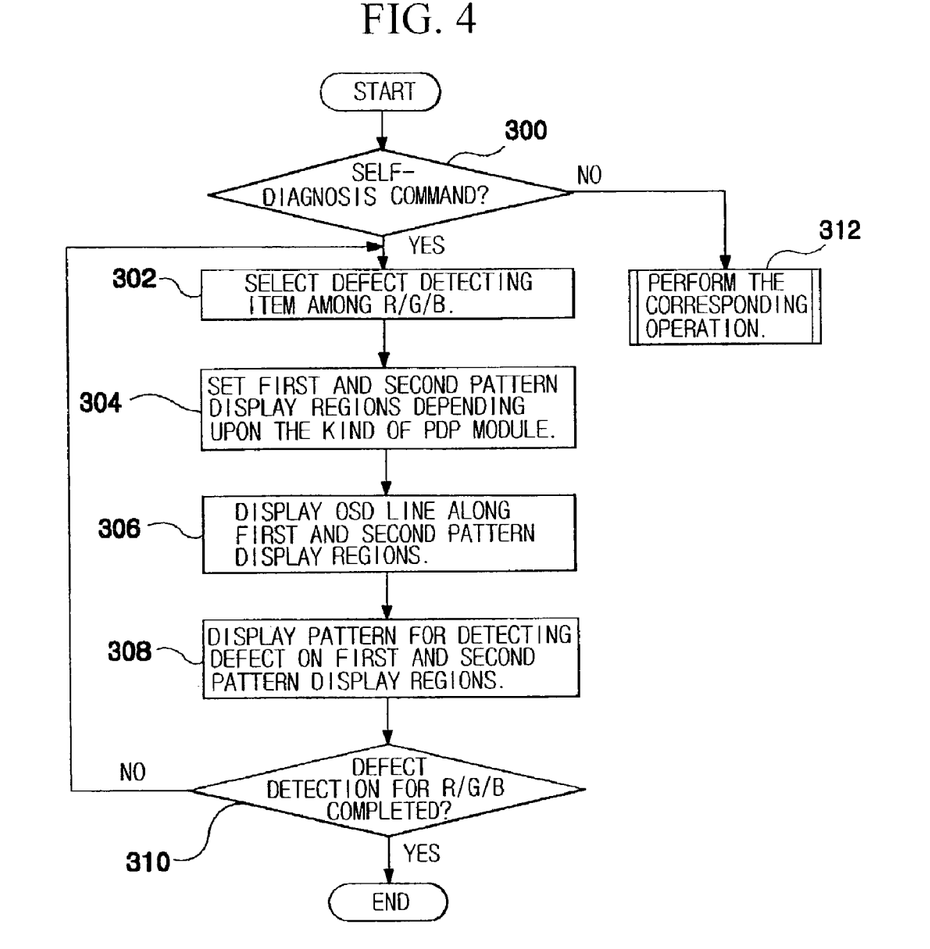
FIG. 4 is a flow chart that shows a process of diagnosing a cell defect of a display device according to a preferred embodiment of the present invention.

As shown in FIG. 4, after a process starts, if the diagnostician inputs a self-diagnostic command via the interface 202 (step S300), the microcomputer 200 can conduct the diagnostician to select an item of which a defect detection is to be carried out among R, G and B. If the diagnostician selects any one of R, G and B under the control of the microcomputer (step S302), the microcomputer 200 can set first and second pattern display regions depending upon the kind of the PDP module 212 (step S304). The microcomputer 200 preferably previously stores the information of the first and second pattern display regions depending upon various kinds of PDP modules, as well as storing information on a specific kind of the corresponding PDP module. In this preferred embodiment, the first pattern display region is set to occupy about 70% of a center portion of the entire screen, while the remaining portion is set as the second pattern display region.

Thus, although the screen can vary between a square and a 1× by 4× rectangle, for example, a center portion can occupy about 70% although the present invention is not intended to be so limited. For example, the percentage of a screen in the first pattern can be increased or decreased. Further, the first pattern can be offset from a center of the screen or a shape of the first pattern can vary from a rectangle/square to include a circle, oval or predetermined shape. In addition, more than two patterns can be used.

When the first and second pattern display regions are completed, preferably the microcomputer 200 can control the OSD IC 214 to output a video signal for displaying an OSD line on a boundary line of the first and second pattern display regions (step S306). The OSD line can allow the diagnostician to distinguish the first and second pattern display regions.

The microcomputer 200 can control the scaler IC 204 to display the pattern or patterns outputted by the pattern generator 208 and the OSD line between the first and second pattern display regions (step S308). For example, as shown in a screen S of a PDP module in FIG. 5 such as a PDP module 212, the pattern is displayed on the first and second pattern display regions TP1 and TP2, and the OSD line L is preferably displayed on the boundary of two regions TP1 and TP2. Thus, a pattern in the first and second pattern display regions TP1 and TP2 can be similar although the present invention is not intended to be so limited.

Figure 5:
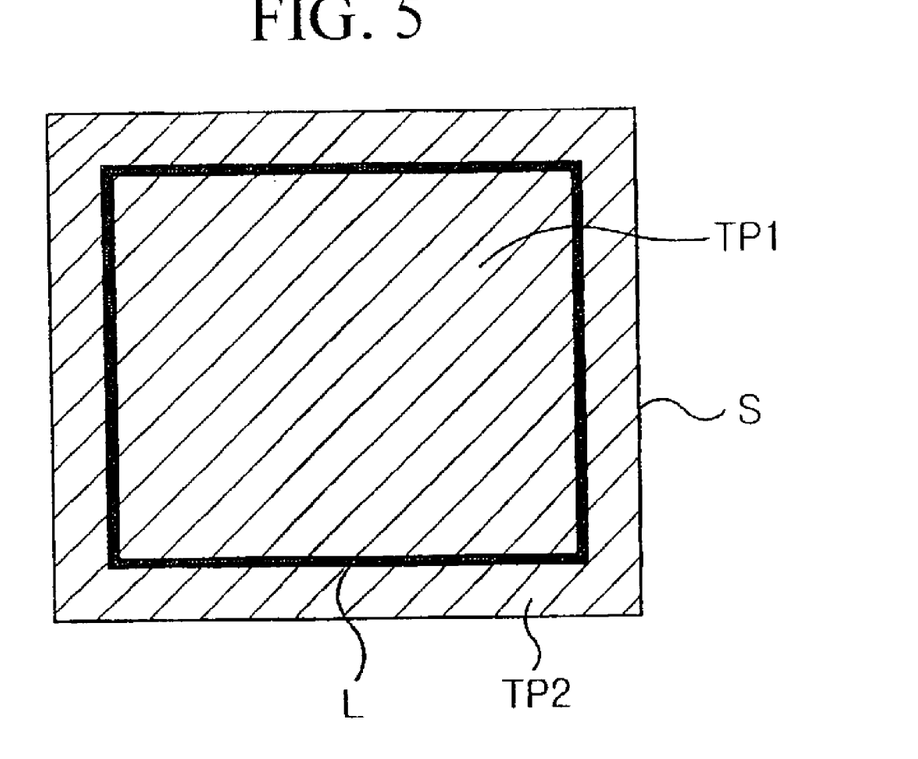
FIG. 5 is a diagram showing an example of a displayed pattern to diagnose a cell defect according to a preferred embodiment of the present invention.

The diagnostician can detect the number of defects by inspecting any defects in the first and second pattern display regions TP1 and TP2 with the unaided eye, and the defect detection is preferably completed relative to the respective R, G and B to thereby finish the PDP defect detection according to the first embodiment of the present invention (step S310).

If the defect detection is completed by the diagnostician, the diagnostician can preferably determine whether or not the corresponding PDP module is defective. A process of determining whether the PDP module is defective according to the first embodiment of the present invention will now be described with reference to FIG. 6.

Figure 6:
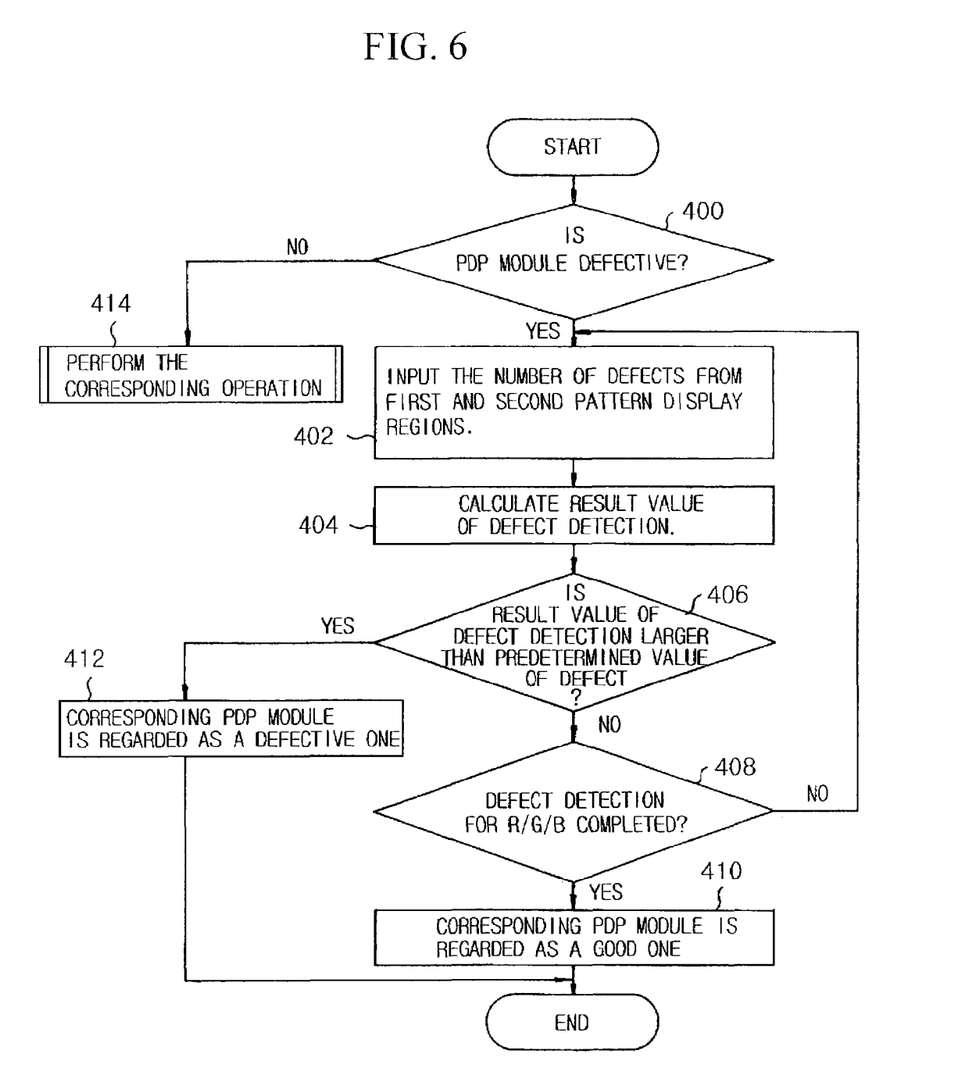
FIG. 6 is a flow chart of a process of determining a defective status of a display device according to a first preferred embodiment of the present invention.

As shown in FIG. 6, after a process starts the diagnostician can request determination via a user interface 202 or the like whether the PDP module 212 is defective (step S400). The microcomputer 200 can prompt a diagnostician to input the number of the defects detected from the respective first and second pattern display regions TP1 and TP2 or the like and accordingly can receive the number of cell defects (step S402). The microcomputer 200 preferably calculates a result value of the defect detection by use of the number of cell detects (step S404). For example, the calculating method is preferably implemented based on the following Equation 1.

$$\text{result value of defect detection} = \text{the number of first pattern display region defects} * A + \text{the number of second pattern display region defects} * B \quad (1)$$

where A and B are weighted value, in which A is set to be larger than B. However, the present invention is not intended to be so limited. The weighted value A is set greater than B to reduce the case in that the PDP module is determined to be defective based on the number of defects in the second pattern display region.

If the result value of defect detection is calculated, the microcomputer 200 determines whether the result value of the defect detection is larger than a predetermined value of the defect (step S406). If the result value of the defect detection is larger than the predetermined value of the defect, the microcomputer 200 can determine that the corresponding PDP module is defective (step S408).

If the result value of the defect detection is smaller than the predetermined value of the defect, the microcomputer 200 can determine whether or not the next color has corresponding defects. If the result values of the defect detection, preferably for all colors, are smaller than the predetermined value, it is regarded that the corresponding PDP is good (steps S408 and S410). Alternatively, a result value could be determined for a cell defect total for all requested colors (e.g., R, G and B).

As described above, according to the first preferred embodiment of a method and apparatus according to the present invention, the diagnostician may detect the cell defect by dividing the screen into two regions. The screen can be divided into the central region and the boundary region by use of the OSD. In addition, according to the first preferred embodiment of the present invention, the different weighted values are applied relative to the respective regions to determine whether or not the PDP module is defect to preferably reduce or minimize the defective fraction of PDP modules.

With the scale-up of the PDP module, it can be very difficult to detect the cell defect for the wide screen. According to a second preferred embodiment of a method and apparatus according to the present invention, the diagnostician may detect the cell defect by varying the region and color to be diagnosed.

According to the second preferred embodiment of the present invention, the region except for the diagnosing region can be blocked to clearly represent the diagnosing region. In addition, the diagnostician may represent the diagnosing region according to a desired size and position.

Figure 7:
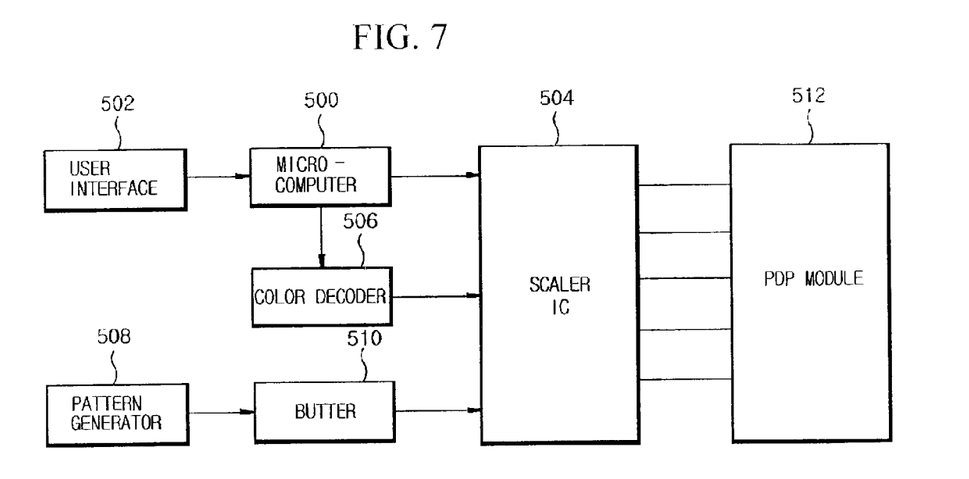
FIG. 7 is a block diagram of a PDP television receiver according to another preferred embodiment of the present invention.

As shown in FIG. 7, a schematic view of a television receiver according to the second embodiment of the present invention shows a microcomputer 500 that can control the television receiver. Preferably, a portion of a screen can be blocked by varying an exemplary internal register value of a scaler IC 504. A user interface 502 can interface between a user and the microcomputer 500. A color decoder 506 can receive a chrominance signal from a broadcasting signal receiver (not shown) to preferably extract luminance signals and a vertical/horizontal sync signal (YUVHV) and then supply the signals to the scaler IC 504. A pattern generator 508 preferably includes various patterns including patterns to diagnose the cell defect, and supplies the pattern to the scaler IC 504 via a buffer 510.

The scaler IC 504 scales the video signals inputted according to the control of the microcomputer 500 to output the result to a PDP module 512. The scaler IC 504 can block the region except for the diagnosing region according to the control of the microcomputer 500. However, the present invention is not intended to be so limited. For example, the region other than the diagnosing region (or a portion thereof) could display a default image, video or color (e.g., blue) that can correspond to the device or a desired video signal (e.g., TV or movie signal).

Figure 10:
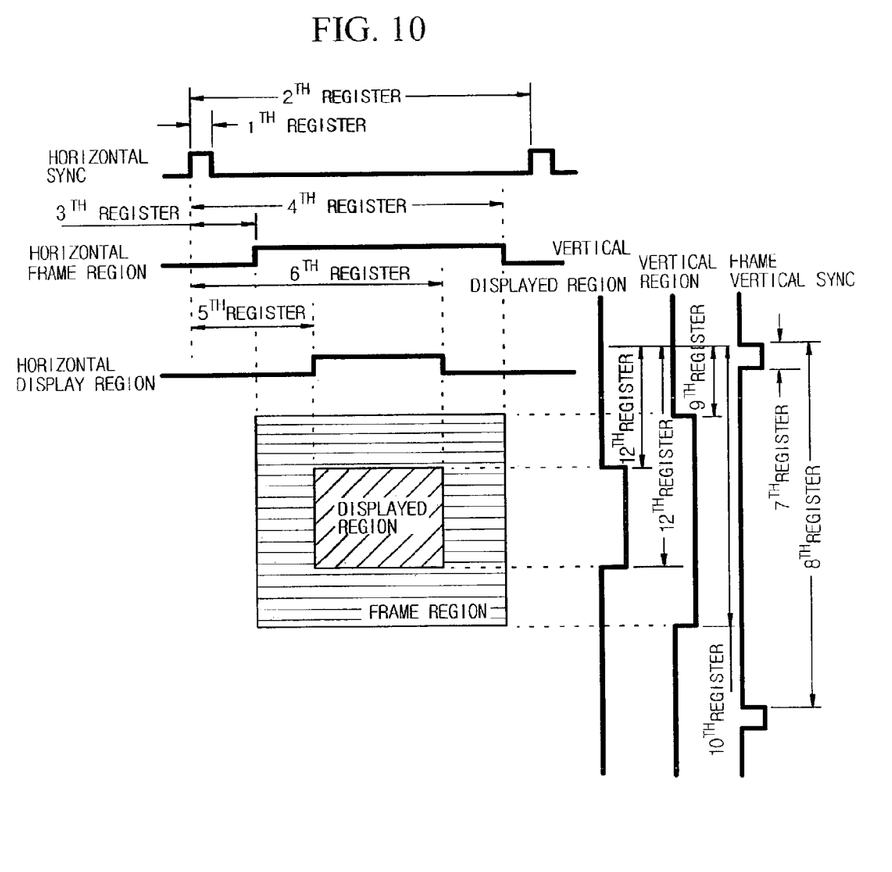
FIG. 10 is a diagram showing an example of a screen display corresponding to a register value provided by a scaler IC.

An exemplary blocking operation of the scaler IC 504 will now be described. As shown in FIG. 10, the scaler IC 504 can include first to twelfth registers for representing a horizontal sync, a horizontal frame region, a horizontal display region, a vertical sync, a vertical frame region and a vertical display region. Values of the first to twelfth registers can correspond to the display region within the frame region. Accordingly, the display region within the frame region can be varied depending upon the value of the first to twelfth registers, and the region except for the display region is blocked. Therefore, the microcomputer 500 can adjust the values of the first to twelfth registers of the scaler IC 504 to display only the region wanted by the diagnostician and block the remaining region.

Figure 8:
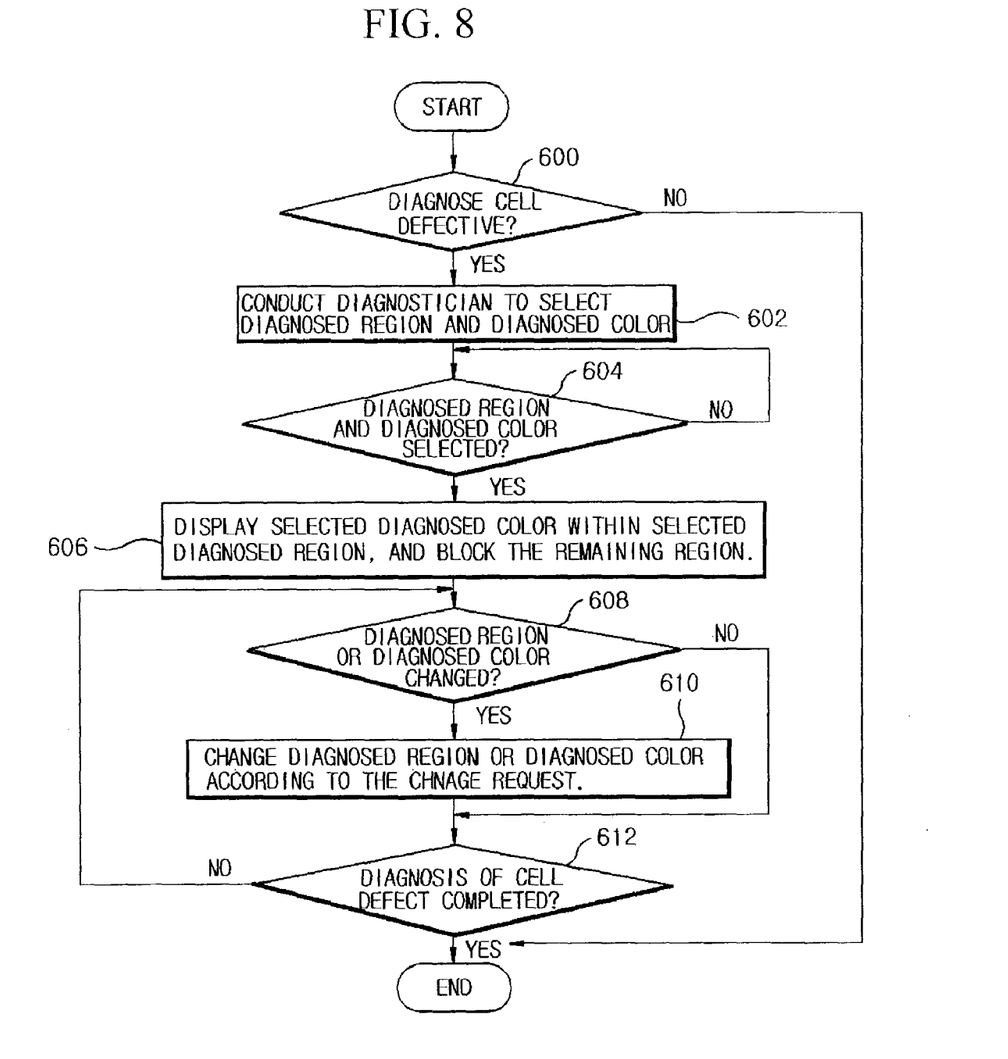
FIG. 8 is a flow chart of a process of diagnosing a cell defect according to another preferred embodiment of the present invention.
Figure 9A:
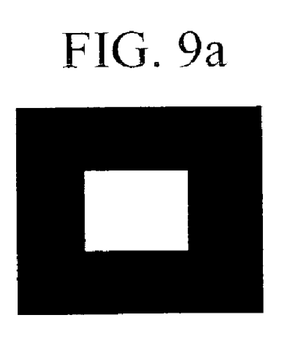
Figure 9B:
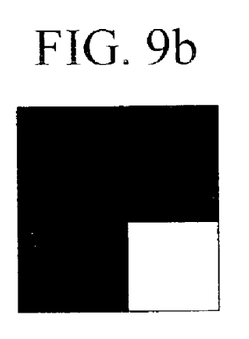
Figure 9C:
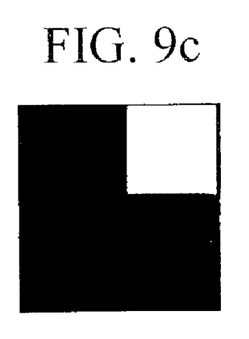
Figure 9D:
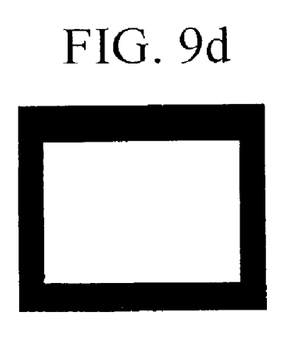
Figure 9E:
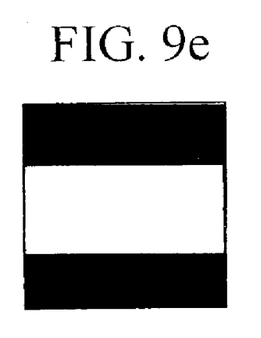
Figure 9F:
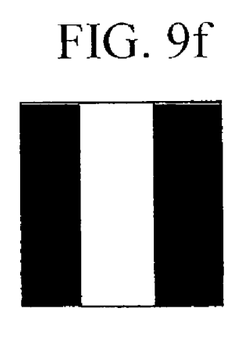

A method of diagnosing the cell defect according to the second preferred embodiment of the present invention will now be described. As shown in FIG. 8, after a process starts the diagnostician can request the diagnosis of the cell defect via the user interface 502, and the microcomputer 500 can prompt or conduct the diagnostician to select region and color to be diagnosed (step S600). If the diagnostician selects the region and color to be diagnosed using the microcomputer (step S604), the microcomputer 200 can display the pattern of the selected color to be diagnosed within the selected region to be diagnosed, and block the remaining region (step S606). The method shown in FIG. 8 can be implemented in the apparatus of FIG. 7 and/or 10. For example, the microcomputer 500 can control a pattern generator 508, a buffer 510, and the scaler IC 504 to output the diagnosing pattern corresponding to the color selected by the diagnostician and simultaneously, vary the values of the first to twelfth registers of the scaler IC 504 to correspond to the region selected by the diagnostician. Only the region selected by the diagnostician is preferably displayed with the diagnosing pattern corresponding to the color selected by the diagnostician, while the remaining region is preferably blocked.

Subsequently, the process can end or the diagnostician can request a change of the diagnosing region or the diagnosing color such as by use of the user interface 502 (step S608). For example, the diagnosing color can include R, G, B or the like and additional prescribed colors such as white. The microcomputer 500 can control the pattern generator 508, the buffer 510, and the scaler IC 504 to change the diagnosing region or diagnosing color in accordance with the request (step S610). Preferably, the microcomputer 500 varies the values of the first to twelfth registers according to the request of the diagnostician to move the diagnosing region to the center, right lower portion or right upper portion of the screen, magnify the diagnosing region as a whole, enlarging it in a width direction or enlarging it in a longitudinal direction, as shown in FIGS. 9A to 9F. However, the present invention is not intended to be so limited.

For example, other shapes and sizes of the diagnosing region than displayed in FIGS. 9A–9F can be used. Further, the diagnosing regions could be equal or different sizes and sequentially cycled through to evaluate a prescribed portion of the entire screen. In addition, the diagnosing region can be magnified, de-magnified or rotated. For example, if a user desired to magnify (e.g., one or more times) a current diagnosing region, two or more subdivisions (e.g., equal sized) of the current diagnosing region could be determined and reviewed selectively as desired or reviewed in a prescribed pattern while the remaining portions are blocked.

The change of the diagnosing region or diagnosing color can continue until the diagnostician commands the completion of the diagnosis of the cell defect using the user interface 502 and the microcomputer 500 or the like (step S612).

As described above, the second preferred embodiment of an apparatus and method according to the present invention can control a position and size of the diagnosing region, for example, by use of the first to twelfth registers of the scaler IC. Further, the position and size of the diagnosing region can be varied according to a prescribed pattern or a request of the diagnostician so that the cell defect can be determined for a screen such as for the wide screen PDP module.

Although preferred embodiments have been described with respect to a cell defect, the present invention is not intended to be so limited. For example, preferred embodiments can be applied to evaluate additional characteristics of a PDP module or screen, including for example, white balance, brightness, contrast, gamma correction or the like. Further, such evaluations can be processed during manufacturing, testing, assembly and/or to evaluate performance or repair (e.g., technician) during use by an end user.

Although preferred embodiments have been described with respect to a PDP module or screen, the present invention is not intended to be so limited. For example, preferred embodiments can be applied to other display devices including for example, an LCD module or screen.

Although preferred embodiments have been described with respect to selective features, the present invention is not intended to be so limited. For example, preferred embodiments according to the present invention are intended to mix or selectively use features of the first preferred embodiment in the second preferred embodiment and vice versa including combinations thereof. For example, various diagnosing regions in FIGS. 9A–9F can have different weights, and a total result value can be determined for a cell defect in one or more diagnosing regions for one or more test colors. Similarly, test patterns can be selectively blocked in methods and apparatus according to the first preferred embodiment. In addition, functions of a scaler can be used as were described with respect to the preferred embodiments. However, the present invention is not intended to be so limited. For example, preferred embodiments can use a OSD function to evaluate cell defects, for example, in a diagnosing region using the method shown in FIG. 8.

As described above, preferred embodiments of a method and apparatus for diagnosing a cell defect according to the present invention have various advantages. Preferred embodiments according to the present invention can divide the screen into first and second pattern regions to support diagnosis of a cell defect. Preferred embodiments can use different weighted values relative to two or more regions to determine whether the display device (e.g., PDP module) is defective to adaptively control the defective fraction of the devices or a defective status of a device. Further, the different weighted value can depend upon the position of the cell defect to determine whether the PDP module is defective, which can set a defective status with increased accuracy. Preferred embodiments according to the present invention can divide the screen into the observing region and the non-observing region to support the diagnosis of the cell defect. Preferred embodiments of the present invention can set a portion of a screen as a diagnosing region, and magnify, demagnify or shifts the diagnosing region or observing region according to the request of a user or the like to allow a diagnostician to diagnose the cell defect for the screen of the PDP module (e.g., wide).

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for diagnosing a cell defect of a Plasma Display Panel (PDP) module, comprising:
    dividing a screen of the Plasma Display Panel (PDP) module into a plurality of regions; and
    displaying a pattern for diagnosing the cell defect on a portion of the regions, wherein at least two of the regions respectively have a different prescribed weight for a corresponding cell defect therein, wherein the displaying comprises shifting the pattern through each of the regions to determine respective cell defects therein, wherein the shifting the pattern comprises combining the respective cell defects with the corresponding weight to determine a score for said each region.

2. The method of claim 1, wherein the remaining portion of the regions do not display the pattern.

3. The method of claim 1, further comprising varying the portion of the regions and pattern according to a control signal.

4. The method of claim 3, wherein the control signal is responsive to a request of a diagnostician or service technician.

5. The method according to claim 1, wherein the screen is displayed and the portion of the regions is a diagnosing region that is displayed magnified, demagnified or moved to a different location on the screen relative to the remaining regions.

6. An apparatus configured to diagnose a cell defect of a Plasma Display Panel (PDP) module, comprising:
   a scaler IC configured to receive and output a pattern for diagnosing the cell defect;
   the PDP module configured to display an output of the scaler IC; and
   a microcomputer configured to control the scaler IC to display the pattern in a diagnosing region of a plurality of regions in a screen of the PDP module, wherein the plurality of regions respectively use different prescribed weights for cell defects therein, wherein the microcomputer is configured to shift the pattern through each of the regions to determine respective cell defects therein and combine the respective cell defects with the corresponding weight to determine a score for said each region; and wherein the microcomputer is configured to combine the plurality of scores to determine a cell defect value for the PDP module.

7. The apparatus of claim 6, comprising a pattern generator configured to provide the pattern.

8. The apparatus of claim 7, wherein the microcomputer controls the pattern generator to vary the pattern provided to the scaler IC.

9. The apparatus of claim 8, wherein the screen is displayed with the diagnosing region magnified, demagnified or moved to a different location on the screen relative to the at least one remaining region.

10. The apparatus of claim 6, wherein the microcomputer adjusts values of registers for setting a display region within a frame of the scaler IC to block the remaining region except for the diagnosing region.

11. The apparatus of claim 6, wherein the microcomputer controls the scaler IC to vary the diagnosing region, and wherein the regions comprise the entire screen of the PDP module.

12. A method, comprising:
   determining a plurality of regions in a display device;
   displaying a pattern for evaluating a characteristic of the display device in the plurality of regions, wherein the evaluating a characteristic identifies a cell defect, and wherein the displaying comprises shifting the pattern through the regions to determine respective cell defects therein, and combining the respective cell defects with different corresponding weights to determine a score for each region; and
   combining the plurality of scores to determine a cell defect value for the display device.

13. The method of claim 12, wherein the first region is one of magnified, demagnified and moved to a different location on a screen.

14. The method of claim 12, wherein the display device is one of a Plasma Display Panel (PDP) module and a Liquid Crystal Display (LCD) device.

15. The method of claim 12, wherein the characteristic is one of a cell defect including white balance, brightness, contrast or gamma correction.

16. The method of claim 12, wherein the remaining regions do not display the pattern.

17. The method of claim 16, wherein the remaining regions display one of a blocked signal, a default device signal and a prescribed video signal.

18. The method of claim 12, wherein the pattern is shifted to a diagnosing region and the remaining regions do not display the pattern.

19. The method of claim 18, wherein the second region surrounds the first region on a screen.

20. The method of claim 18, comprising:
   comparing the cell defect value to a prescribed value to determine a defective status for the display device.

21. The method of claim 20, wherein the shifting the pattern comprises determining said respective cell defects for a plurality of colors.

22. The method of claim 21, wherein the pattern varies for at least two of the regions, and wherein the colors include at least one of Red, Green, Blue and a prescribed color.

* * * * *